A. MILNE & A. JOURDAIN.
Watch-Stem.

No. 206,598. Patented July 30, 1878.

Witness
John H. Ross.
H. C. Jenkins

Inventor
Alexander Milne
Armand Jourdain
By Horace Harris atty

UNITED STATES PATENT OFFICE.

ALEXANDER MILNÉ AND ARMAND JOURDAIN, OF NEWARK, NEW JERSEY.

IMPROVEMENT IN WATCH-STEMS.

Specification forming part of Letters Patent No. 206,598, dated July 30, 1878; application filed June 13, 1878.

*To all whom it may concern:*

Figure 1:
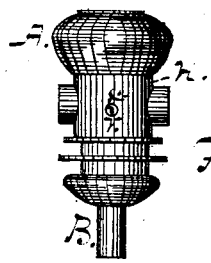
Figure 2:
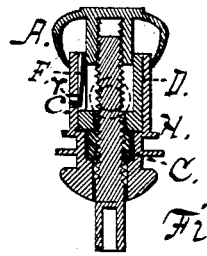

Be it known that we, ALEXANDER MILNÉ and ARMAND JOURDAIN, of Newark, in the county of Essex and State of New Jersey, have invented a new and useful Improvement in Watch-Stems for Stem-Winding Watches, of which the following is a specification:

Figure 1 is a side elevation. Fig. 2 is a sectional elevation.

This invention relates, in stem-winding watches, to the means employed in attaching and detaching the stem-winding crown to or from the pendant of a watch-case, for the purpose of inserting or removing the movements in or from a case, the object being to increase the facility for attaching or detaching the crown.

To the crown A is attached the threaded key-pipe B, the end being screwed into the crown; but before this connection is made the adjustable nut C is turned on the pipe, and is used to gage the action of the crown on the spring of the watch-case. The nut serves also as a collar to hold the crown and key-pipe on the collar D. After the nut is put on the pipe the collar D is also slipped on from the same end, and then the pipe is screwed into the crown, the end of the collar also extending into the crown; or the pipe may be made fast in the crown, and be screw-threaded from the other end, and the collar and nut be put on from that end. To the inner end of the collar D, lying in a groove in the inside of it, is a spring, F, having the point $c$ bent outward through the side of the collar, and as far beyond the outside of it as is required to pass through the side of the pendant H and appear in the hole $v$ in the same, when the collar on the pipe has been pushed into the end of the pendant, the spring and point taking the place of a set-screw in attaching the crown to the pendant of the watch-case.

To withdraw the crown the point $c$ is depressed, when it is easily detached.

By the automatic action of the spring the connection is very rapidly made or severed between the crown and the case, and a large advantage is gained; therefore

What we claim as our invention, and desire to secure by Letters Patent, is—

1. In the stem-winding crown attachment for watches, the threaded key-pipe B, having the adjustable nut C, in combination with the collar D, substantially and for the purposes specified.

2. In combination with the watch-case pendant H and the threaded key-pipe B, having the adjustable nut C, the collar D, provided with the spring F and point $c$, substantially as and for the purpose set forth.

ALEXANDER MILNÉ.
ARMAND JOURDAIN.

Witnesses:
HORACE HARRIS,
JOHN H. ROSS.